United States Patent [19]

Smits

[11] Patent Number: 5,425,904
[45] Date of Patent: Jun. 20, 1995

[54] PROCESS FOR ACTIVATING VULCANIZED WASTE RUBBER PARTICLES AND A PROCESS FOR PRODUCING A RUBBER-LIKE ARTICLE USING SAID ACTIVATED WASTE RUBBER PARTICLES

[75] Inventor: Richard A. J. Smits, Maastricht, Netherlands

[73] Assignee: Vredestein Icopro B.V., Netherlands

[21] Appl. No.: 50,473

[22] PCT Filed: Dec. 5, 1991

[86] PCT No.: PCT/NL91/00253

§ 371 Date: May 18, 1993

§ 102(e) Date: May 18, 1993

[87] PCT Pub. No.: WO92/10540

PCT Pub. Date: Jun. 25, 1992

[30] Foreign Application Priority Data

Dec. 5, 1990 [NL] Netherlands .......................... 9002673

[51] Int. Cl.$^6$ ............................................. B29C 43/02
[52] U.S. Cl. ..................................... 264/37; 264/115; 264/123; 264/DIG. 69
[58] Field of Search ................. 264/115, 37, DIG. 69, 264/123

[56] References Cited

U.S. PATENT DOCUMENTS

| | | | |
|---|---|---|---|
| 4,003,408 | 1/1977 | Turner | 264/DIG. 69 |
| 4,125,578 | 11/1978 | Sear | 264/DIG. 69 |
| 4,290,470 | 9/1981 | Williams et al. | 264/37 |
| 4,320,082 | 3/1982 | Houle | 264/DIG. 69 |
| 4,382,052 | 5/1983 | Arimatsu | 264/37 |
| 4,440,208 | 4/1984 | Trickel et al. | 264/DIG. 69 |
| 4,481,335 | 11/1984 | Stark, Jr. | 525/261 |
| 5,075,057 | 12/1991 | Hoedl | 264/115 |
| 5,094,905 | 3/1992 | Murray | 264/115 |
| 5,114,648 | 5/1992 | Kuc, Sr. | 264/DIG. 69 |

FOREIGN PATENT DOCUMENTS

| | | | |
|---|---|---|---|
| 2009869 | 10/1970 | Germany . | |
| 55-145744 | 11/1980 | Japan . | |
| 315512 | 7/1929 | United Kingdom . | |
| 1183381 | 10/1985 | U.S.S.R. | 264/37 |

OTHER PUBLICATIONS

Derwent Publications Ltd., London GB. Class A, AN8-1-03101D, re JP55145 744.

Primary Examiner—Allan R. Kuhns
Attorney, Agent, or Firm—Ladas & Parry

[57] ABSTRACT

A process for activating vulcanized waster rubber particles by treating the waste rubber particles with a rubber latex and a curing system and drying the treated waste rubber particles. The waste rubber particles are preferably treated with 1 to 4% by weight of rubber latex (calculated as dry substance) and 0.5 to 3% by weight of sulfur as vulcanizing agent, both being calculated on the waster rubber particles. The treatment is carried out conveniently by mixing the waste rubber particles with the vulcanizing agent, adding the latex at a temperature of from 70° to 90° C. and stirring the obtained mixture for 5 to 10 min. so as to evaporate the water. Also disclosed are processes for producing a rubber-like article by molding the activated waste rubber particles, whether or not mixed with a non-vulcanized rubber compound, while applying heat and pressure.

17 Claims, No Drawings

PROCESS FOR ACTIVATING VULCANIZED WASTE RUBBER PARTICLES AND A PROCESS FOR PRODUCING A RUBBER-LIKE ARTICLE USING SAID ACTIVATED WASTE RUBBER PARTICLES

This invention relates to a process for activating vulcanized (cured) waste rubber particles by treating the waste rubber particles with a non-vulcanized rubber polymer and a vulcanizing agent.

In order to prevent waste rubber and in particular the growing quantity of scrapped automobile tires from becoming damaging to the environment, it is highly desirable to recycle this material. Recycling of waste rubber can be carried out by grinding and adding the waste rubber particles to rubber mixtures for manufacturing new products. This process, however, leads to a strong deterioration of the physical properties. Another method of recycling is to reclaim the waste rubber in which the network formed by vulcanization is thermally degraded. The reclaimed material can be added to rubber mixtures for manufacturing new products. This process leads to a loss of physical properties, because the properties of the reclaimed material are poor in comparison with virgin polymers which due to the random decomposition of the network during reclaiming. U.S. Pat. No. 4,481,335 proposes a process for activating cured waste rubber particles. In this process 100 parts by weight of particulate, cured rubber are mixed with from 1 to 5 parts by weight of a liquid, sulfur-curable polymeric binder having ethylenic unsaturation and being soluble in hexane and/or benzene and having a viscosity at 140° C. of not greater than about $10^6$ cp, and with a curing agent in a quantity of from 50 to 500% by weight of the polymeric binder.

The polymeric binder is preferably a homopolymer or copolymer of 1,4-butadiene. The applied polymers have a molecular weight of from 1000 to 100,000, and preferably from 1000 to 50,000. The polymeric binder is obtained by drying a commercially available aqueous emulsion, e.g. by stirring the emulsion in a Waring mixer at approximately 65° C. The curing agent may be any of the curing agents commonly used, such as sulfur or sulfur donors. The waste rubber particles, the polymeric binder and the curing agent are mixed at a temperature of approximately 60° to 140° C. until a homogeneous, dry mixture is obtained.

The obtained activated waste rubber particles can be added in a quantity of preferably 25 to 75% by weight to rubber mixtures for producing rubber-like products, wherein the loss of physical properties is considerably reduced in comparison with the application of untreated waste rubber particles. The subsequent PCT-application WO 88/02313 of the same applicant as that of the above-mentioned U.S. patent specification relates to a vehicle tire having a tread portion comprising the cured product of a rubber molding composition containing from 20 to 80% by weight of waste rubber particles activated by the process of the above U.S. patent specification. The tensile strength and the elongation-at-break properties of the treads are less than those by applying rubber mixtures without activated rubber particles, while the wear resistance is as good as that when applying rubber mixtures without activated rubber particles. Thus a mixture of 40% by weight of activated rubber particles and 60% by weight of styrene-butadiene rubber compound gives a product having an approximately 25% lower tensile strength than when only the styrene-butadiene rubber compound i used.

DE-A-2,009,869 discloses a process for manufacturing an article wherein vulcanized waste rubber particles are mixed with a rubber latex and a vulcanizing system. A crumbly product is obtained which is brought into moulds and compressed. Then the filled moulds are dried by blowing air. Finally the moulded product is optionally subjected to a second compression yielding a more dense product. Using the process of DE-A-2,009,869 it is only possible to make rubber-like articles entirely consisting of activated waste rubber particles. Said articles have relatively poor physical properties.

The object of the present invention is to provide a more simple process for activating vulcanized waste rubber particles. Further it is an object of the invention to provide activated waste rubber particles which when added to rubber mixtures yield an even lower loss of physical properties than obtained when using the known activated waste rubber particles.

This invention provides a process for activating vulcanized waste rubber particles by treating the waste rubber particles with a non-vulcanized rubber polymer and a vulcanizing agent, characterized in that said waste rubber particles are treated with a rubber latex and a vulcanizing agent, after which said treated waste rubber particles are dried under such conditions that substantially no vulcanisation occurs.

According to the invention a rubber latex is applied while according to the prior art a dried latex is used. The process of the invention has the advantage that a liquid is used which is easier to handle and which is much less viscous than the polymeric binder of the above-mentioned US patent specification. Further it appeared that mouldings manufactured from the activated rubber powder of the invention possess a higher tensile strength than mouldings manufactured from rubber powder activated according to the prior art.

The application of a latex has further the advantage than the rubbers present therein may have a higher molecular weight. Such high molecular weight rubbers are not possible in the prior art process since then a too viscous liquid or a rubber sheet is obtained by drying the latex. The application of rubbers having a higher molecular weight yields a stronger bond between the activated rubber particles and the rubber matrix. Although applicant does not want to be bound by theory, it is assumed that the anchorage of the activated rubber particles in the rubber matrix after vulcanization is better in that the rubber of the latex may penetrate deeper into the particles. Electron microscopic research has demonstrated that the rubber of the latex indeed penetrates deeply into the particles.

The vulcanized waste rubber particles used in the process according to the invention consist of natural or synthetic rubber or a combination thereof. A main source of vulcanized waste rubber particles are automobile tires. For an optimal balance of production of activated rubber powder, processing the activated rubber powder and reinforcing properties the average particle size should be smaller than 0.5 mm, and preferably of from 0.2 to 0.4 mm. The particle size may, however, under certain conditions and dependent on the application, be up to 1 mm.

The particles can be obtained by pulverising complete scrapped automobile tires and/or merely the treads thereof. As a result the particles may contain besides vulcanized rubber other components such as canvas, etc.

Scrapped automobile tires may easily be ground by cryogenic processes wherein the rubber is cooled e.g. in liquid nitrogen and then is pulverised. A drawback of this method is that particles having straight break surfaces are formed. The scrapped automobile tires may also be ground by "mill-stones". However, oxidation of the rubber particles takes place, because of the increased temperature occurring therewith. The scrapped automobile tires and/or the treads thereof are preferably ground mechanically at room temperature, as a result of which particles are formed with a large number of cavities and consequently with a specific surface area as large as possible. The treatment according to the invention with the rubber latex and the vulcanizing agent is then the most effective.

According to the invention the waste rubber particles are treated with a rubber latex and a vulcanizing agent. The rubber latex may be any conventional latex on water base. Conventional latices may be based on both natural rubber and synthetic rubber, such as copolymers of styrene and 1,4-butadiene, copolymers of acrylonitrile and 1,4-butadiene, copolymers of 2-chloro-1,4-butadiene and 2-chloro-1,2-butadiene, etc. Preferably a latex based on natural rubber and/or styrene-butadiene rubber is used. The latices generally have a content of dry rubber of from 50 to 70% by weight and preferably 60 to 65% by weight.

The rubber present in the latex may have any molecular weight of approximately 1000 up to more than 2,000,000. The rubber preferably has a considerably high molecular weight of more than 100,000, and rubbers having a molecular weight of from 200,000 to 2,000,000 are more preferred.

The vulcanizing agent may be any of the vulcanizing agents commonly used, such as sulfur or sulfur donors. The term "vulcanizing agent" as used herein also includes optional other agents such as accelerators, retarders and activators.

The waste rubber particles are preferably treated with such a quantity of latex and vulcanizing agent that a layer of approximately 0.5 to 2 $\mu$pn is formed on the particles. For this purpose a quantity of from 1 to 4% by weight of rubber latex (calculated as dry substance) and of from 0.5 to 3% by weight of sulfur, both calculated on the waste rubber particles, are used.

By varying the concentrations of sulfur or sulfur donor, accelerators and retarders the scorch-time and the speed of vulcanization of the final mixture can be controlled and also a specific physical property of a mixture may be optimized.

The treatment of the waste rubber particles with the latex and the vulcanizing agent may e.g. be carried out by mixing the waste rubber particles with the latex, in which the vulcanizing agent is dispersed. The drawback of this method is, however, that a beginning of vulcanization may not be prevented. Therefore it is preferred that first the waste rubber particles are mixed with the vulcanizing agent, and then the latex is slowly added at a rate of from 0.5 to 1% by weight/min. calculated on the waste rubber particles. The latex is preferably added at increased temperature, so that the drying step is carried out simultaneously. In that case the latex is added at a temperature of from 70° to 90° C. and preferably of from 75° to 85° C., whereafter the obtained mixture is stirred for about another 5 to 10 min. at said increased temperature, so as to evaporate the water present in the latex.

In general the drying step of the treated waste rubber particles should take place under such conditions that substantially no vulcanization occurs, i.e. at a not too high temperature and during a short period of time.

The waste rubber particles activated according to the invention can be used as such for the manufacture of an article. When the activated waste rubber particles are milled and vulcanized in a press during 12 min. at 150° C. an article having a tensile strength of approximately 11 MPa is obtained. The tensile strength of an article formed in the same manner from non-activated waste rubber particles is approximately 5 MPa, and the tensile strength of an article formed from rubber particles activated according to the process of the above-mentioned U.S. Pat. No. 4,481,335 is not higher than about 7.5 MPa.

The waste rubber particles activated according to the invention are preferably added to rubber mixtures, whereafter the obtained mixture is molded and vulcanized.

Therefore the invention also relates to a process for manufacturing a rubber-like article by mixing activated waste rubber particles, which are obtained by the above described process, with a non-vulcanized rubber compound and molding the obtained mixture while applying heat and pressure.

The activated rubber particles may be incorporated in the rubber mixture at any desirable proportion depending on the desired application. The activated rubber particles are preferably used in a quantity of from 5 to 50% by weight, calculated on the total mixture. Many rubber-like articles, particularly treads of tires, can be manufactured by this process.

The following examples will illustrate the present invention.

Example I a) Activating waste rubber particles.

3.0 kg of waste rubber powder obtained by pulverising scrapped automobile tires and having a particle size of between 0.2 and 0.4 mm was mixed with 45 g of sulfur in a laboratory mixer at 50° C. at a speed of about 2000 rpm. Due to the generated friction the added chemicals were finely ground and properly dispersed. After the temperature increased to 80° C., 150 g of latex based on natural rubber having a molecular weight of about 1,000,000 and having a minimum content of dry rubber of 60% was added slowly to the powder. Then stirring was continued for about another 7 min. at 1000 rpm. so as to evaporate the water present in the latex. The temperature was kept at 80° C. As a result a dry, loose powder was obtained.

b) Producing a rubber-like article.

The activated waste rubber powder obtained in a) was mixed in a 2.5 l laboratory internal mixer with different rubber mixtures A-F the compositions of which are indicated in Table 1. The sulfur component of the mixtures, however, was added onto the mill. The activated waste rubber powder was added in two different proportions, 25 and 50% by weight respectively, calculated on the total mixture. The activated rubber powder was added in the first step at a dump temperature of 140° C. The samples were vulcanized at 170° C. Additionally samples were manufactured applying only the rubber mixtures, consequently without using waste rubber powder. The properties of the molded rubber articles are summarized in Tables 2, 3 and 4.

TABLE 1

| Mixture | A | B | C | D | E | F |
|---|---|---|---|---|---|---|
| NR | 100 | 100 | 100 | — | — | — |
| SBR 1500 | — | — | — | 100 | 100 | 100 |
| HAF N330 (carbon black) | 55 | 55 | 55 | 55 | 55 | 55 |
| Aromatic oil | 5 | 5 | 5 | 5 | 5 | 5 |
| TMQ (antioxydant) | 1.5 | 1.5 | 1.5 | 1.5 | 1.5 | 1.5 |
| 6PPD (antiozonant) | 1.5 | 1.5 | 1.5 | 1.5 | 1.5 | 1.5 |
| Protective wax | 2 | 2 | 2 | 2 | 2 | 2 |
| ZnO | 5 | 5 | 5 | 5 | 5 | 5 |
| Stearic acid | 1 | 1 | 1 | 1 | 1 | 1 |
| Sulphur | 2.5 | 1 | 0.75 | 2.5 | 1 | 0.75 |
| CBS (accelerator) | 1 | 2 | — | 1 | 2 | — |
| TBTD (accelerator) | — | — | 0.75 | — | — | 0.75 |
| TETD (accelerator) | — | 1 | — | — | 1 | — |
| NOBS (MOR) (accelerator) | — | — | 1.7 | — | — | 1.7 |
| CTP (retarder) | 0.5 | 0.5 | — | 0.5 | 0.5 | — |

TABLE 2

Properties of rubber articles obtained using activated waste rubber powder compared with the reference.

| Mixture | A | | | B | | |
|---|---|---|---|---|---|---|
| Conc. powder (wt %) | 0 | 25 | 50 | 0 | 25 | 50 |
| Rheograph (170° C.) | | | | | | |
| t2 (s) | 109 | 99 | 107 | 81 | 47 | 65 |
| t50 (s) | 158 | 152 | 167 | 114 | 73 | 92 |
| t90 (s) | 194 | 212 | 250 | 127 | 85 | 106 |
| t90-t2 (s) | 85 | 113 | 143 | 46 | 38 | 41 |
| min. torque (PSI) | 19 | 22 | 47 | 18 | 27 | 31 |
| max. torque (PSI) | 75 | 88 | 67 | 76 | 87 | 86 |
| Hardness (Shore A) | 61 | 60 | 59 | 64 | 63 | 63 |
| Tensile strength (MPa) | 23.6 | 21.3 | 18.1 | 23.2 | 20.0 | 18.9 |
| elongation at break (%) | 498 | 458 | 434 | 476 | 410 | 389 |
| Tear strength: Delft-meth. (N) | 120 | 111 | 80 | 109 | 91 | 92 |
| Tear strength: DIN 53507 (N/mm) | 20.7 | 17.5 | 15.7 | 21.3 | 15.4 | 15.0 |
| Wear resistance (mm³) DIN 53516 | 126 | 165 | 150 | 128 | 142 | 119 |
| Compression set (%) | | | | | | |
| 72 h. - 23° C. | 9.3 | 16.3 | 14.5 | 13.4 | 13.1 | 13.9 |
| 24 h. - 70° C. | 33.0 | 35.6 | 40.2 | 21.0 | 24.0 | 25.1 |
| 72 h. - 70° C. | 41.2 | 43.8 | 52.9 | 27.0 | 33.9 | 33.5 |
| Resilience (%) | | | | | | |
| 23° C. | 50.0 | 50.0 | 48.0 | 50.0 | 52.0 | 52.0 |
| 70° C. | 66.0 | 65.0 | 62.0 | 63.5 | 65.0 | 64.0 |

TABLE 3

Properties of rubber articles obtained using activated waste rubber powder compared with the reference.

| Mixture | C | | | D | | |
|---|---|---|---|---|---|---|
| Conc. powder (wt. %) | 0 | 25 | 50 | 0 | 25 | 50 |
| Rheograph (170 C.) | | | | | | |
| t2 (s) | 90 | 65 | 67 | 139 | 91 | 65 |
| t50 (s) | 135 | 92 | 100 | 237 | 140 | 98 |
| t90 (s) | 159 | 105 | 122 | 375 | 213 | 195 |
| t90-t2 (s) | 69 | 40 | 55 | 236 | 122 | 130 |
| min. torque (PSI) | 19 | 27 | 32 | 14 | 21 | 33 |
| max. torque (PSI) | 67 | 72 | 81 | 85 | 91 | 94 |
| Hardness (Shore A) | 61 | 58 | 62 | 67 | 64 | 66 |
| Tensile strength (MPa) | 23.3 | 19.3 | 20.5 | 20.6 | 16.8 | 17.3 |
| Elongation at break (%) | 504 | 495 | 408 | 440 | 360 | 324 |
| Tear strength: Delft-meth. (N) | 108 | 92 | 96 | 56 | 52 | 46 |
| Tear strength: DIN 53507 (N/mm) | 27.3 | 27.5 | 14.0 | 12.0 | 10.2 | 8.0 |
| Wear resistance (mm³) DIN 53516 | 133 | 126 | 135 | 87 | 103 | 106 |
| Compression set (%) | | | | | | |
| 72 h. - 23° C. | 9.9 | 17.2 | 12.7 | 11.5 | 11.1 | 11.4 |
| 24 h. - 70° C. | 21.0 | 41.9 | 31.3 | 28.8 | 20.4 | 17.5 |
| 72 h. - 70° C. | 27.5 | 51.7 | 41.7 | 37.3 | 27.3 | 32.5 |
| Resilience (%) | | | | | | |
| 23° C. | 48.5 | 50.0 | 52.0 | 40.5 | 43.0 | 47.0 |
| 70° C. | 62.5 | 61.0 | 66.0 | 51.5 | 56.0 | 61.0 |

TABLE 4

Properties of rubber articles obtained using activated waste rubber powder compared with the reference.

| Mixture | E | | | F | | |
|---|---|---|---|---|---|---|
| Conc. powder (wt. %) | 0 | 25 | 50 | 0 | 25 | 50 |
| Rheograph (170° C.) | | | | | | |
| t2 (s) | 104 | 130 | 99 | 177 | 143 | 104 |
| t50 (s) | 152 | 199 | 164 | 280 | 204 | 156 |
| t90 (s) | 187 | 300 | 271 | 359 | 314 | 234 |
| t90-t2 (s) | 83 | 170 | 172 | 182 | 171 | 130 |
| min. torque (PSI) | 13 | 21 | 31 | 13 | 20 | 32 |
| max. torque (PSI) | 82 | 64 | 71 | 68 | 65 | 73 |
| Hardness (Shore A) | 66 | 57 | 59 | 63 | 57 | 58 |
| Tensile strength (MPa) | 19.3 | 14.4 | 14.7 | 21.7 | 13.5 | 15.6 |
| Elongation at break (%) | 435 | 492 | 422 | 609 | 465 | 393 |
| Tear strength: Delft-meth. (N) | 56 | 66 | 52 | 69 | 65 | 59 |
| Tear strength: DIN 53507 (N/mm) | 10.5 | 21.4 | 13.4 | 19.0 | 121.5 | 14.2 |
| Wear resistance (mm³) DIN 53516 | 97 | 129 | 126 | 97 | 132 | 119 |

TABLE 4-continued

Properties of rubber articles obtained using activated waste rubber powder compared with the reference.

| Mixture | E | | | F | | |
|---|---|---|---|---|---|---|
| Compression set (%) | | | | | | |
| 72 h. - 23° C. | 11.6 | 24.1 | 18.3 | 16.2 | 21.6 | 18.6 |
| 24 h. - 70° C. | 15.7 | 33.5 | 29.5 | 26.5 | 30.4 | 33.5 |
| 72 h. - 70° C. | 23.3 | 50.0 | 39.4 | 35.7 | 51.5 | 50.0 |
| Resilience (%) | | | | | | |
| 23° C. | 41.5 | 42.0 | 45.0 | 40.0 | 42.0 | 46.0 |
| 70° C. | 52.0 | 49.0 | 54.0 | 46.5 | 49.0 | 55.0 |

Example II

The methods of Examples Ia) and Ib) were followed, except that 140 g of latex based on a styrene-butadiene-rubber having about 32% of styrene and having a molecular weight of from 200,000 to 2,000,000 and having a dry rubber content of about 65% and having a particle distribution of from 2.5 to $3.5 \times 10^{-7}$m was used in step a). Together with sulfur also 22.5 g of accelerator NOBS was added. The properties of the molded rubber-like articles are summarized in Tables 5, 6 and 7.

TABLE 5

Properties of rubber articles obtained using activated waste rubber powder compared with the reference.

| Mixture | A | | | B | | |
|---|---|---|---|---|---|---|
| Conc. powder (wt. %) | 0 | 25 | 50 | 0 | 25 | 50 |
| Rheograph (170° C.): | | | | | | |
| t2 (s) | 109 | 104 | 101 | 81 | 70 | 76 |
| t50 (s) | 158 | 152 | 141 | 114 | 98 | 106 |
| t90 (s) | 194 | 193 | 189 | 127 | 110 | 118 |
| t90-t2 (s) | 85 | 89 | 88 | 46 | 40 | 42 |
| min. torque (PSI) | 19 | 22 | 31 | 18 | 22 | 30 |
| max. torque (PSI) | 75 | 76 | 79 | 76 | 79 | 84 |
| Hardness (Shore A) | 61 | 63 | 61 | 64 | 65 | 65 |
| Tensile strength (MPa) | 23.6 | 20.4 | 19.4 | 23.2 | 19.2 | 18.2 |
| Elongation at break (%) | 498 | 421 | 378 | 476 | 388 | 334 |
| Tear strength: Delft-meth. (N) | 120 | 104 | 71 | 109 | 89 | 74 |
| Tear strength: DIN 53507 (N/mm) | 20.7 | 18.2 | 16.0 | 21.3 | 13.4 | 12.7 |
| Wear resistance (mm³) DIN 53516 | 126 | 115 | 126 | 128 | 116 | 128 |
| Compression set (%) | | | | | | |
| 72 h. - 23° C. | 9.3 | 10.7 | 15.4 | 13.4 | 10.6 | 14.3 |
| 24 h. - 70° C. | 33.0 | 25.2 | 35.2 | 21.0 | 16.8 | 24.8 |
| 72 h. - 70° C. | 41.2 | 50.9 | 45.7 | 27.0 | 37.0 | 31.7 |
| Resilience (%) | | | | | | |
| 23° C. | 50.0 | 50.5 | 49.0 | 50.0 | 49.0 | 48.5 |
| 70° C. | 66.0 | 66.0 | 64.0 | 63.5 | 63.0 | 63.5 |

TABLE 6

Properties of rubber articles obtained using activated waste rubber powder compared with the reference.

| Mixture | C | | | D | | |
|---|---|---|---|---|---|---|
| Conc. powder (wt. %) | 0 | 25 | 50 | 0 | 25 | 50 |
| Rheograph (170° C.): | | | | | | |
| t2 (s) | 90 | 80 | 86 | 139 | 110 | 92 |
| t50 (s) | 135 | 115 | 121 | 237 | 180 | 161 |
| t90 (s) | 159 | 133 | 139 | 375 | 281 | 251 |
| t90-t2 (s) | 69 | 53 | 53 | 236 | 171 | 159 |
| min. torque (PSI) | 19 | 24 | 30 | 14 | 20 | 31 |
| max. torque (PSI) | 67 | 72 | 79 | 85 | 84 | 82 |
| Hardness (Shore A) | 61 | 64 | 64 | 67 | 66 | 65 |
| Tensile strength (MPa) | 23.3 | 19.7 | 18.9 | 20.6 | 18.7 | 17.8 |
| Elongation at break (%) | 504 | 402 | 363 | 440 | 378 | 362 |
| Tear strength: Delft-meth. (N) | 108 | 93 | 78 | 56 | 53 | 52 |
| Tear strength: DIN 53507 (N/mm) | 27.3 | 16.2 | 14.2 | 12.0 | 11.6 | 13.8 |
| Wear resistance (mm³) DIN 53516 | 133 | 111 | 121 | 87 | 91 | 101 |
| Compression set (%) | | | | | | |
| 72 h. - 23° C. | 9.9 | 11.2 | 14.9 | 11.5 | 12.7 | 16.0 |
| 24 h. - 70° C. | 21.0 | 18.1 | 27.8 | 28.8 | 18.5 | 36.4 |
| 72 h. - 70° C. | 27.5 | 37.5 | 35.4 | 37.3 | 45.6 | 48.5 |
| Resilience (%) | | | | | | |
| 23° C. | 48.5 | 48.5 | 49.0 | 40.5 | 43.0 | 45.0 |
| 70° C. | 62.5 | 63.0 | 64.0 | 51.5 | 56.0 | 58.5 |

TABLE 7

Properties of rubber articles obtained using activated waste rubber powder compared with the reference.

| Mixture | E | | | F | | |
|---|---|---|---|---|---|---|
| Conc. powder (wt. %) | 0 | 25 | 50 | 0 | 25 | 50 |
| Rheograph (170° C.): | | | | | | |
| t2 (s) | 104 | 90 | 77 | 177 | 133 | 105 |
| t50 (s) | 152 | 125 | 110 | 280 | 195 | 151 |
| t90 (s) | 187 | 158 | 137 | 359 | 271 | 202 |
| t90-t2 (s) | 83 | 68 | 60 | 182 | 138 | 97 |
| min. torque (PSI) | 13 | 20 | 31 | 13 | 20 | 32 |
| max. torque (PSI) | 82 | 86 | 88 | 68 | 73 | 79 |
| Hardness (Shore A) | 66 | 65 | 66 | 63 | 62 | 64 |
| Tensile strength (MPa) | 19.3 | 16.8 | 16.9 | 21.7 | 16.3 | 16.8 |
| Elongation at break (%) | 435 | 347 | 311 | 609 | 428 | 366 |
| Tear strength: Delft-meth. (N) | 56 | 49 | 42 | 69 | 64 | 51 |
| Tear strength: DIN 53507 (N/mm) | 10.5 | 8.8 | 7.2 | 19.0 | 15.9 | 10.8 |
| Wear resistance (mm³) DIN 53516 | 97 | 102 | 107 | 97 | 102 | 104 |
| Compression set |  |  |  |  |  |  |

TABLE 7-continued

Properties of rubber articles obtained using activated waste rubber powder compared with the reference.

| Mixture | | | E | | | F |
|---|---|---|---|---|---|---|
| (%) | | | | | | |
| 72 h. - 23° C. | 11.6 | 12.0 | 14.5 | 16.2 | 15.2 | 17.6 |
| 24 h. - 70° C. | 15.7 | 12.7 | 22.9 | 26.5 | 21.5 | 31.5 |
| 72 h. - 70° C. | 23.3 | 29.3 | 30.3 | 35.7 | 40.5 | 41.2 |
| Resilience (%) | | | | | | |
| 23° C. | 41.5 | 43.0 | 46.0 | 40.0 | 42.5 | 45.0 |
| 70° C. | 52.0 | 55.0 | 58.0 | 46.5 | 51.0 | 56.0 |

The above results show the following influences of the addition of the rubber powder activated according to the invention on the physical properties of the molded rubber articles.

Scorch-Time

The addition of activated powder leads to a reduction of the scorch-time in all cases; this problem can be removed by adapting the composition of the rubber mixture or by adding a retarder to the curing system in the coating.

Curing Rate

The addition of activated powder leads to higher curing rates which results into a reduction of the vulcanization time.

Minimum Torque

The addition of activated powder leads to a higher level of the minimum couple and consequently to a higher viscosity of unvulcanized material.

Max Torque

The addition of activated powder leads to the same or a higher level of the maximum couple which means that the activated powder has been incorporated into the three dimensional network.

Hardness

The addition of activated powder has no influence on the hardness in Shore A.

Tensile Strength

Using activated powder in natural rubber mixtures there is substantially no difference between a coating on the basis of natural rubber-latex and on the basis of styrene-butadiene latex. Using activated powder in styrene-butadiene mixtures a coating based on styrene-butadiene latex is preferred. Depending upon the vulcanization system in the mixture to be applied, the tensile strength in a natural rubber mixture will reduce by 14% on an average when using 25% of activated powder based on natural rubber latex and will reduce by 18% on an average when using 50% of activated powder. In a styrene-butadiene mixture the tensile strength, depending upon the vulcanization system in the mixture to be applied, will reduce by approximately 16% when using 25% of activated powder based on styrene-butadiene latex and will reduce by approximately 20% when using 50% of activated powder.

Wear Resistance DIN 53516

The addition of activated powder leads to a slight reduction of the wear resistance in the natural rubber mixtures and to a slight increase in the styrene-butadiene rubber mixtures.

Permanent Set by Compression

The influence of the addition of activated powder on the permanent set by compression is low; a slight increase is observed.

Resilience

The addition of activated powder to the natural rubber mixture does not substantially influence the resilience; however, the resilience of the styrene-butadiene rubber mixtures increases a little.

I claim:

1. In a process for forming a rubber-like article from waste rubber particles, wherein the waste rubber particles are activated by treatment with a non-vulcanized rubber polymer and a vulcanizing agent, and wherein activated waste rubber particles are molded into said article with the application of heat and pressure, the improvement comprising (a) activating the waste rubber particles by treating the same with a rubber latex and with said vulcanizing agent, (b) then drying the waste rubber particles, said waste rubber particles being treated with sufficient rubber latex and vulcanizing agent in step (a) to increase the tensile strength of the article, and (c) mixing the waste rubber particles treated in steps (a) and (b) with a non-vulcanized rubber compound prior to being molded with the application of heat and pressure.

2. A process according to claim 1, wherein the waste rubber particles are treated with 1 to 4% by weight of the rubber latex, based upon the dry weight of the rubber latex, and 0.5 to 3% by weight of sulphur as the vulcanizing agent, the weights of said rubber latex and said sulphur being calculated based upon the weight of said waste rubber particles.

3. A process according to claim 1, wherein said waste rubber particles are mixed with the vulcanizing agent, after which the latex is added at a temperature of from 70° to 90° C. to form a resulting mixture and the resulting mixture is stirred during 5 to 10 min. at said temperature so as to evaporate the water present in the latex.

4. A process according to claim 3, wherein the addition of the latex and the evaporation of the water take place at a temperature of from 75° to 85° C.

5. A process according to claim 1, wherein said latex is based on natural rubber and/or styrene butadiene rubber.

6. A process according to claim 1, wherein said latex is based on a rubber having a molecular weight of more than 100,000.

7. A process according to claim 6, wherein said latex is based on a rubber having a molecular weight of from 200,000 to 2,000,000.

8. A process according to claim 1, wherein said vulcanized waste rubber particles are obtained by mechanically grinding at room temperature scrapped tires and/or the treads thereof and have an average particles size of from 0.2 to 0.4 mm.

9. A process as claimed in claim 1 wherein said waste rubber particles are mixed with the vulcanizing agent, after which the latex is added at a temperature of from 70° to 90° C. to form a resulting mixture, and the resulting mixture is stirred for 5 to 10 min. at said temperature so as to evaporate the water present in the latex.

10. In a process for forming a rubber-like article from waste rubber particles, wherein the waste rubber particles are activated by treatment with a non-vulcanized rubber polymer and a vulcanizing agent, and wherein activated waste rubber particles are molded into said article with the application of heat and pressure, the improvement comprising (a) activating the waste rubber particles by treating the same with a rubber latex and with said vulcanizing agent and (b) then drying the waste rubber particles, the waste rubber particles being treated with sufficient rubber latex and vulcanizing agent in step (a) to increase the tensile strength of the article to higher than 7.5 MPa.

11. A process according to claim 10 wherein the waste rubber particles are treated with 1 to 4% by weight of the rubber latex based upon the dry weight of the rubber latex and 0.5 to 3% by weight of sulphur as the vulcanizing agent, the weights of said rubber latex and said sulphur being calculated based upon the weight of said waste rubber particles.

12. A process according to claim 10 wherein said waste rubber particles are mixed with the vulcanizing agent after which the latex is added at a temperature of from 70° to 90° C. to form a resulting mixture and the resulting mixture is stirred during 5 to 10 min. at said temperature so as to evaporate the water present in the latex.

13. A process according to claim 12, wherein the addition of the latex and the evaporation of the water take place at a temperature of from 75° to 85° C.

14. A process according to claim 10, wherein said latex is based on natural rubber and/or styrene butadiene rubber.

15. A process according to claim 10 wherein said latex is based on a rubber having a molecular weight of more than 100,000.

16. A process according to claim 15, wherein said latex is based on a rubber have a molecular weight of from 200,000 to 2,000,000.

17. A process according to claim 10, wherein said vulcanized waste rubber particles are obtained by mechanically grinding at room temperature scrapped tires and/or treads thereof and have an average particle size of from 0.2 to 0.4 mm.

* * * * *